United States Patent
Song et al.

(10) Patent No.: US 10,462,050 B1
(45) Date of Patent: Oct. 29, 2019

(54) SYSTEMS AND METHODS FOR CHAINING VIRTUAL PRIVATE NETWORKS

(71) Applicant: Symantec Corporation, Mountain View, CA (US)

(72) Inventors: Qu Bo Song, Singapore (SG); Shaun Aimoto, Ontario (CA); Joseph Chen, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 16/022,784

(22) Filed: Jun. 29, 2018

(51) Int. Cl.
| | |
|---|---|
| *H04L 12/715* | (2013.01) |
| *H04L 29/06* | (2006.01) |
| *H04L 12/24* | (2006.01) |
| *H04L 12/761* | (2013.01) |
| *H04L 12/46* | (2006.01) |

(52) U.S. Cl.
CPC .......... *H04L 45/64* (2013.01); *H04L 41/0803* (2013.01); *H04L 45/16* (2013.01); *H04L 63/0272* (2013.01); *H04L 63/0428* (2013.01); *H04L 12/4641* (2013.01)

(58) Field of Classification Search
None
See application file for complete search history.

(56) References Cited

U.S. PATENT DOCUMENTS

| | | | | |
|---|---|---|---|---|
| 2011/0142053 | A1* | 6/2011 | Van Der Merwe | ..... H04L 47/72 370/395.1 |
| 2014/0007220 | A1* | 1/2014 | Pepin | .................. H04L 63/0272 726/15 |
| 2014/0325681 | A1* | 10/2014 | Kleidermacher | ... G06F 21/6218 726/29 |
| 2017/0171156 | A1* | 6/2017 | Schultz | ............... H04L 63/0272 |
| 2017/0272255 | A1* | 9/2017 | Larson | .................. H04L 9/3263 |
| 2017/0324714 | A1* | 11/2017 | Wainner | ............. H04L 63/0272 |
| 2018/0054420 | A1* | 2/2018 | Mindte | ............... H04L 63/0407 |

* cited by examiner

*Primary Examiner* — Mohammad S Adhami
(74) *Attorney, Agent, or Firm* — FisherBroyles, LLP

(57) ABSTRACT

The disclosed computer-implemented method for chaining virtual private networks may include (i) establishing a virtual private network client that routes network traffic to a virtual private network, (ii) establishing an additional virtual private network client that routes the network traffic to an additional virtual private network, (iii) configuring the virtual private network client for split routing such that the virtual private network client routes different ranges of incoming network traffic to respective different network addresses, (iv) configuring the additional virtual private network client to route all incoming network traffic according to a default route, and (v) chaining the virtual private network client and the additional virtual private network client such that they process incoming network traffic in series. Various other methods, systems, and computer-readable media are also disclosed.

20 Claims, 6 Drawing Sheets

SYSTEMS AND METHODS FOR CHAINING VIRTUAL PRIVATE NETWORKS

BACKGROUND

Some computer security vendors, such as SYMANTEC, have provided customers with a custom virtual private network client. In some cases, the custom virtual private network client may include a cross-platform network detection component. The detection component may perform traffic inspection of network traffic. For example, the detection component may inspect network traffic to check whether the network traffic indicates a security risk, such as a network intrusion or a malware installation.

Additionally, computer security vendors may coordinate in some cases with native virtual private network clients. These native virtual private network clients may be provided by a corresponding operating system environment, such as the iOS operating system environment and/or the WINDOWS OPERATING system environment. In these examples, the native virtual private network clients may encrypt network traffic.

In view of the above, it would be helpful to combine these two examples of virtual private network clients to provide both traffic inspection and encryption on the same computing device. Nevertheless, some computing environments may be configured in a manner that creates a conflict and prevents chaining of these two virtual private network clients. To address this problem, the instant disclosure identifies and addresses a need for improved systems and methods for chaining virtual private networks.

SUMMARY

As will be described in greater detail below, the instant disclosure describes various systems and methods for chaining virtual private networks. In one example, a computer-implemented method for chaining virtual private networks may include (i) establishing a virtual private network client that routes network traffic to a virtual private network, (ii) establishing an additional virtual private network client that routes the network traffic to an additional virtual private network, (iii) configuring the virtual private network client for split routing such that the virtual private network client routes different ranges of incoming network traffic to respective different network addresses, (iv) configuring the additional virtual private network client to route all incoming network traffic according to a default route, and (v) chaining the virtual private network client and the additional virtual private network client such that they process incoming network traffic in series.

In one embodiment, the virtual private network client may include a custom virtual private network client that performs traffic inspection. In one embodiment, the additional virtual private network client may include a native virtual private network client that an operating system provides to perform traffic encryption.

In some examples, chaining the virtual private network client and the additional virtual private network client enables an end user to benefit from both the traffic inspection performed by the custom virtual private network client and the traffic encryption performed by the native virtual private network client. In some examples, configuring the virtual private network client for split routing may include replacing a default route configuration with a split route configuration.

In one embodiment, the virtual private network client and the additional virtual private network client are established within a computing environment that is configured to create a conflict upon detecting that both the virtual private network client and the additional virtual private network client route all incoming network traffic to the default route and configuring the virtual private network client for split routing prevents the conflict such that chaining the virtual private network client and the additional virtual private network client is enabled.

In one embodiment, the computing environment includes an iOS operating system environment and the computing environment is configured to disable the additional virtual private network client upon detecting that both the virtual private network client and the additional virtual private network client route all incoming network traffic to the default route. In one embodiment, the computing environment includes a WINDOWS operating system environment and the computing environment is configured to remove a default route configuration for the additional virtual private network client in response to detecting that both the virtual private network client and the additional virtual private network client route all incoming network traffic to the default route.

In one embodiment, the different ranges of incoming network traffic sum together to effectively form the default route. In one embodiment, the different ranges of incoming network traffic sum together to effectively cover the entire range of INTERNET PROTOCOL version 4 addresses.

In one embodiment, a system for implementing the above-described method may include (i) an establishment module, stored in memory, that establishes a virtual private network client that routes network traffic to a virtual private network and that establishes an additional virtual private network client that routes the network traffic to an additional virtual private network, (ii) a configuration module, stored in memory, that configures the virtual private network client for split routing such that the virtual private network client routes different ranges of incoming network traffic to respective different network addresses and that configures the additional virtual private network client to route all incoming network traffic according to a default route, (iii) a chaining module, stored in memory, that chains the virtual private network client and the additional virtual private network client such that they process incoming network traffic in series, and (iv) at least one physical processor configured to execute the establishment module, the configuration module, and the chaining module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) establish a virtual private network client that routes network traffic to a virtual private network, (ii) establish an additional virtual private network client that routes the network traffic to an additional virtual private network, (iii) configure the virtual private network client for split routing such that the virtual private network client routes different ranges of incoming network traffic to respective different network addresses, (iv) configure the additional virtual private network client to route all incoming network traffic according to a default route, and (v) chain the virtual private network client and the additional virtual private network client such that they process incoming network traffic in series.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
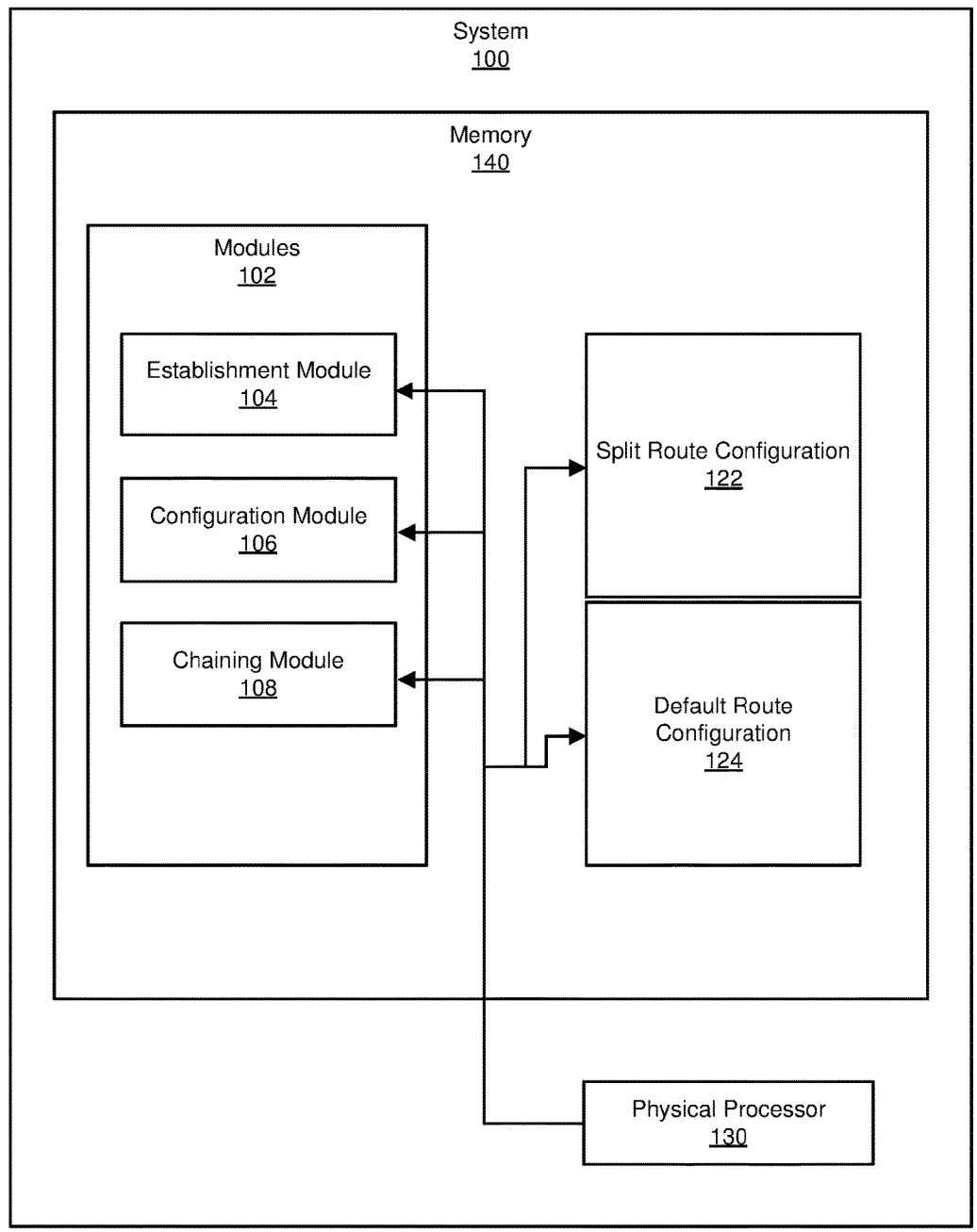
FIG. 1 is a block diagram of an example system for chaining virtual private networks.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for chaining virtual private networks. As will be explained in further detail below, the disclosed subject matter may improve upon related systems by combining the traffic inspection features of one virtual private network with the traffic encryption features of another virtual private network. Moreover, the disclosed subject matter may provide both of these virtual private networks, and their corresponding benefits to end users, by overcoming a conflict that otherwise exists when both virtual private networks are configured to use the same default route. More specifically, the disclosed subject matter may overcome this conflict by replacing a default route configuration for one of the virtual private networks with a split route configuration. In this case, the split route configuration may effectively simulate the default route.

Figure 2:
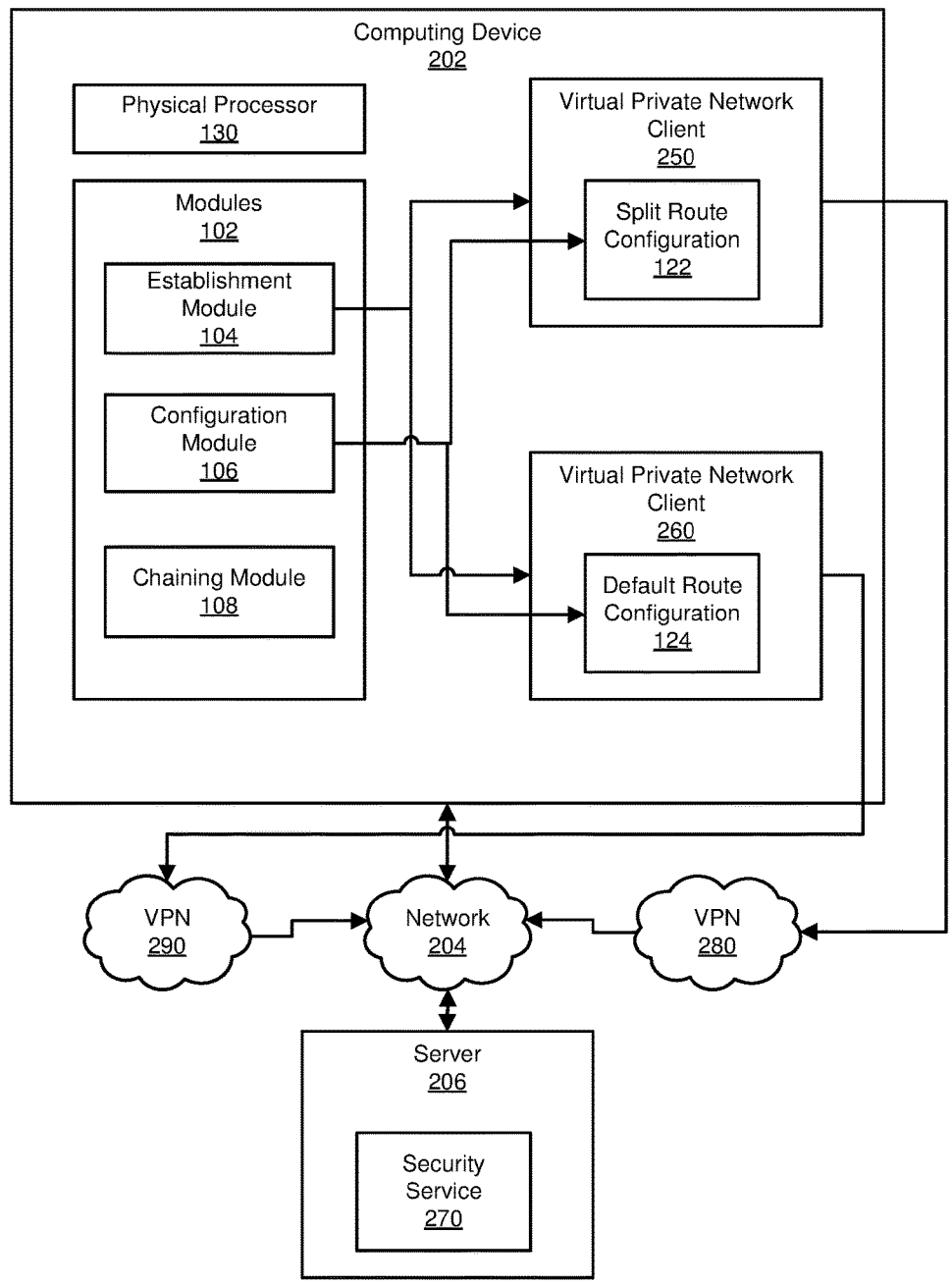
FIG. 2 is a block diagram of an additional example system for chaining virtual private networks.

The following will provide, with reference to FIGS. 1-2, detailed descriptions of example systems for chaining virtual private networks. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of exemplary system 100 for chaining virtual private networks. As illustrated in this figure, exemplary system 100 may include one or more modules 102 for performing one or more tasks. For example, and as will be explained in greater detail below, exemplary system 100 may include an establishment module 104 that establishes a virtual private network client that routes network traffic to a virtual private network. Establishment module 104 may also establish an additional virtual private network client that routes network traffic to an additional virtual private network. Exemplary system 100 may additionally include a configuration module 106 that configures the virtual private network client for split routing, according to a split route configuration 122, such that the virtual private network client routes different ranges of incoming network traffic to respective different network addresses. Configuration module 106 may also configure the additional virtual private network client to route all incoming network traffic according to a default route, which is further indicated by a default route configuration 124. Exemplary system 100 may also include a chaining module 108 that chains the virtual private network client and the additional virtual private network client such that they process incoming network traffic in series. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate chaining virtual private networks. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system.

For example, and as will be described in greater detail below, establishment module 104 may establish a virtual private network client 250 that routes network traffic to a virtual private network 280. Establishment module 104 may establish an additional virtual private network client 260 that routes the network traffic to an additional virtual private network 290. Configuration module 106 may configure virtual private network client 250 for split routing, according to split route configuration 122, such that virtual private network client 250 routes different ranges of incoming network traffic to respective different network addresses. Configuration module 106 may also configure additional virtual private network client 260 to route all incoming network traffic according to a default route, as further indicated by default route configuration 124. Lastly, chaining module 108 may chain virtual private network client 250 and additional virtual private network client 260 such that they process incoming network traffic in series.

Additionally, FIG. 2 illustrates how computing device 202 may also coordinate with server 206, which may correspond to a backend security server of a security vendor. The security vendor may provide a security service 270, which may optionally include transmitting one or more of virtual private network client 250 and virtual private network client 260 to customers.

Computing device 202 generally represents any type or form of computing device capable of reading computer-executable instructions. In some illustrative examples, computing device 202 may correspond to an end user computing device that is protected by a security product issued by a security vendor. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of facilitating the performance of method 300, as discussed further below. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
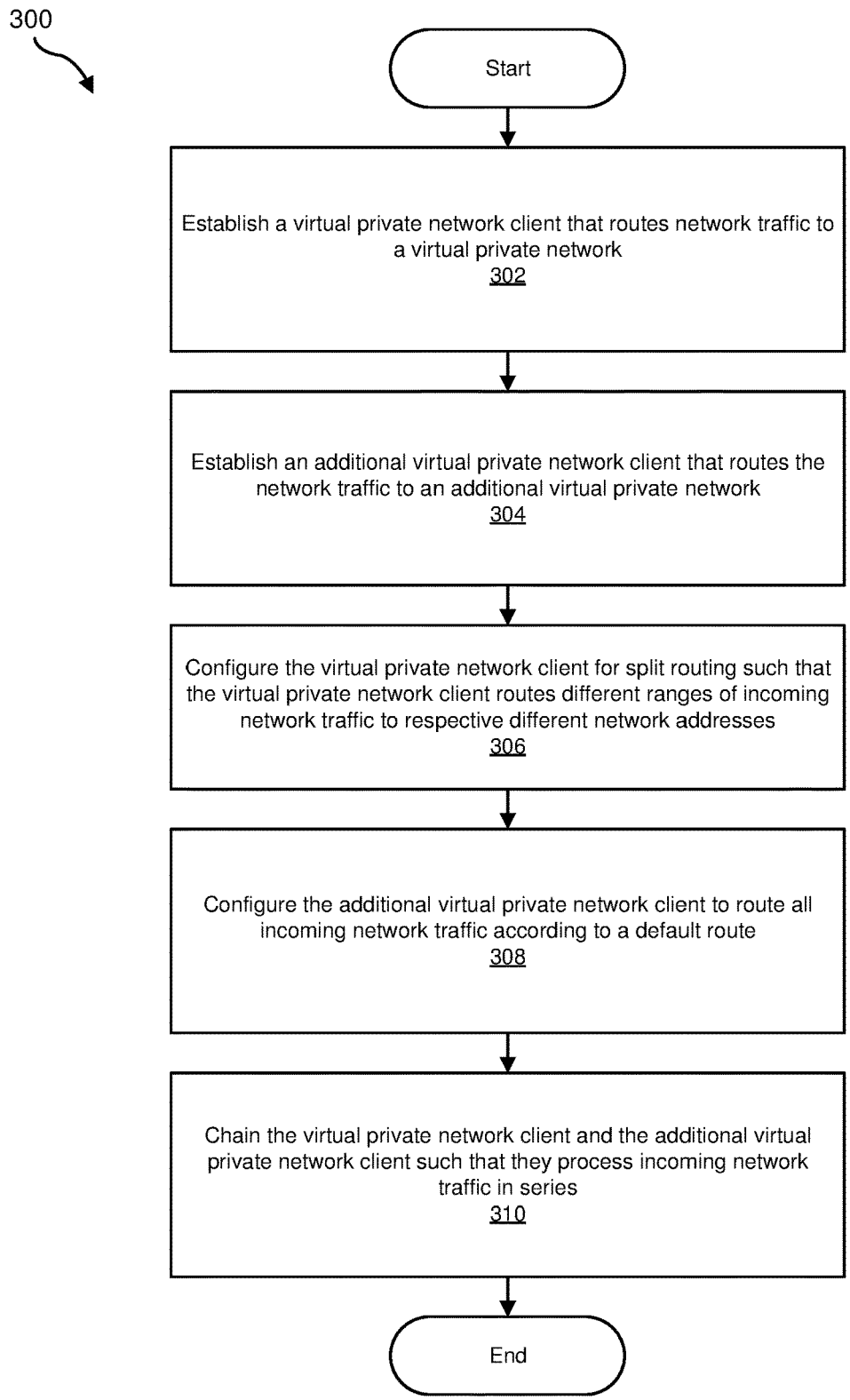
FIG. 3 is a flow diagram of an example method for chaining virtual private networks.

FIG. 3 is a flow diagram of an example computer-implemented method 300 for chaining virtual private networks. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may establish a virtual private network client that routes network traffic to a virtual private network. For example, establishment module 104 may, as part of computing device 202 in FIG. 2, establish virtual private network client 250 that routes network traffic to virtual private network 280.

Establishment module 104 may establish the virtual private network client in a variety of ways. In general, establishment module 104 may establish the virtual private network client by configuring, installing, and/or setting up the virtual private network client. Establishment module 104 may establish the virtual private network client by configuring the virtual private network client to accept incoming network traffic and reroute the incoming network traffic to a corresponding virtual private network. For example, establishment module 104 may establish the virtual private network client to accept a network packet that targets an original network address and reroute the network packet to a different network address. In some examples, the network traffic may proceed from the virtual private network to the original network address. In these examples, the virtual private network may effectively function as a different origination point for the network traffic than the actual origination point for the network traffic at computing device 202 (e.g., the virtual private network client simulates the network traffic emerging from the virtual private network rather than emerging from computing device 202). In some examples, the virtual private network client may correspond to a virtual private network adapter.

In one embodiment, the virtual private network client may include a custom virtual private network client that performs traffic inspection. The virtual private network client may perform traffic inspection in a variety of ways. In some examples, the virtual private network client may include an internal component that inspects network traffic itself. For example, virtual private network client 250 may accept incoming network traffic and inspect the incoming network traffic in an effort to detect one or more security threats. Additionally, or alternatively, the virtual private network client may perform traffic inspection by rerouting network traffic to another network device that performs traffic inspection. For example, the virtual private network client may optionally reroute network traffic to security service 270 of FIG. 2, which may perform traffic inspection as part of a backend security server, and then return the inspected network traffic so that the inspected network traffic may be transmitted according to conventional network transmission procedures. In these examples, the traffic inspection performed by security service 270 may result in one or more packets of network traffic being flagged, intercepted, and/or blocked. For example, security service 270 may flag, intercept, and/or block one or more network packets that violate a security policy.

At step 304, one or more of the systems described herein may establish an additional virtual private network client that routes the network traffic to an additional virtual private network. For example, establishment module 104 may, as part of computing device 202 in FIG. 2, establish additional virtual private network client 260 that routes network traffic to additional virtual private network 290.

Establishment module 104 may establish the additional virtual private network client in a variety of ways. In general, establishment module 104 may establish the additional virtual private network client in a manner that parallels the establishment of the first virtual private network client at step 302 of method 300, as further discussed above. For example, establishment module 104 may establish the additional virtual private network client by configuring, installing, and/or setting up the additional virtual private network client. Establishment module 104 may configure the additional virtual private network to reroute incoming network traffic to virtual private network 290.

In one embodiment, the additional virtual private network client may include a native virtual private network client that an operating system provides to perform traffic encryption. For example, a computing environment such as an iOS operating system environment and/or a WINDOWS operating system environment may provide a native virtual private network client. The native virtual private network client may perform traffic encryption. For example, the native virtual private network client may encrypt network traffic and then transmit the encrypted network traffic to virtual private network 290. Additionally, one or more network devices that form virtual private network 290 may be configured to receive the encrypted network traffic and also be configured to decrypt the encrypted network traffic according to the same encryption protocol. In this manner, the additional virtual private network client may optionally function as a tunnel that tunnels network traffic from its actual origination point at computing device 202 to an alternative origination point at virtual private network 290. In these examples, the additional virtual private network client may effectively function as a tunnel in the sense that outsider computing devices, without access to the corresponding encryption protocol and encryption keys, cannot decrypt or parse the encrypted network traffic until the encrypted network traffic emerges unencrypted from the end of the tunnel at virtual private network 290.

Notably, in some examples, the additional virtual private network client may provide the encryption functionality while also substantially omitting or lacking a network traffic inspection feature, as further discussed above in connection with the first virtual private network client of step 302 of method 300. Similarly, the first virtual private network client of step 302 of method 300 may provide the traffic inspection functionality while also substantially omitting or lacking the traffic encryption feature. In this manner, the first virtual private network client and the additional virtual private network client may optionally complement each other such that one or both of these virtual private network clients provides functionality that is substantially lacking, or omitted, at the other one of these virtual private network clients.

At step 306, one or more of the systems described herein may configure the virtual private network client for split routing such that the virtual private network client routes different ranges of incoming network traffic to respective different network addresses. For example, configuration module 106 may, as part of computing device 202 in FIG. 2, configure virtual private network client 250 for split routing, according to a split route configuration 122, such that virtual private network client 250 routes different ranges of incoming network traffic to respective different network addresses.

As used herein, the phrase "such that the virtual private network client routes different ranges of incoming network traffic to respective different network addresses" generally refers to the virtual private network client processing different ranges of incoming network traffic in different manners or according to different algorithms, such that the network traffic is directed to different network addresses depending on which range the network traffic originally targets. For example, in one illustrative embodiment the virtual private network client may process one range of network traffic in a conventional manner, without applying the virtual private network, and may process a different range of network traffic in a different manner by forwarding the network traffic to the virtual private network.

Configuration module 106 may configure the virtual private network client in a variety of ways. In general, configuration module 106 may configure the virtual private network client by determining, or setting, a routing table that specifies how incoming network traffic is rerouted by the virtual private network client. In some examples, configuration module 106 may further configure the virtual private network client to perform network traffic inspection, as discussed in more detail above regarding step 302 of method 300. Additionally, or alternatively, configuration module 106 may further configure the virtual private network client to perform network traffic encryption, as discussed in more detail above regarding step 304 of method 300. Moreover, configuration module 106 may configure the virtual private network client by establishing a routing configuration, such as a default route configuration and/or a split route configuration.

Figure 4:
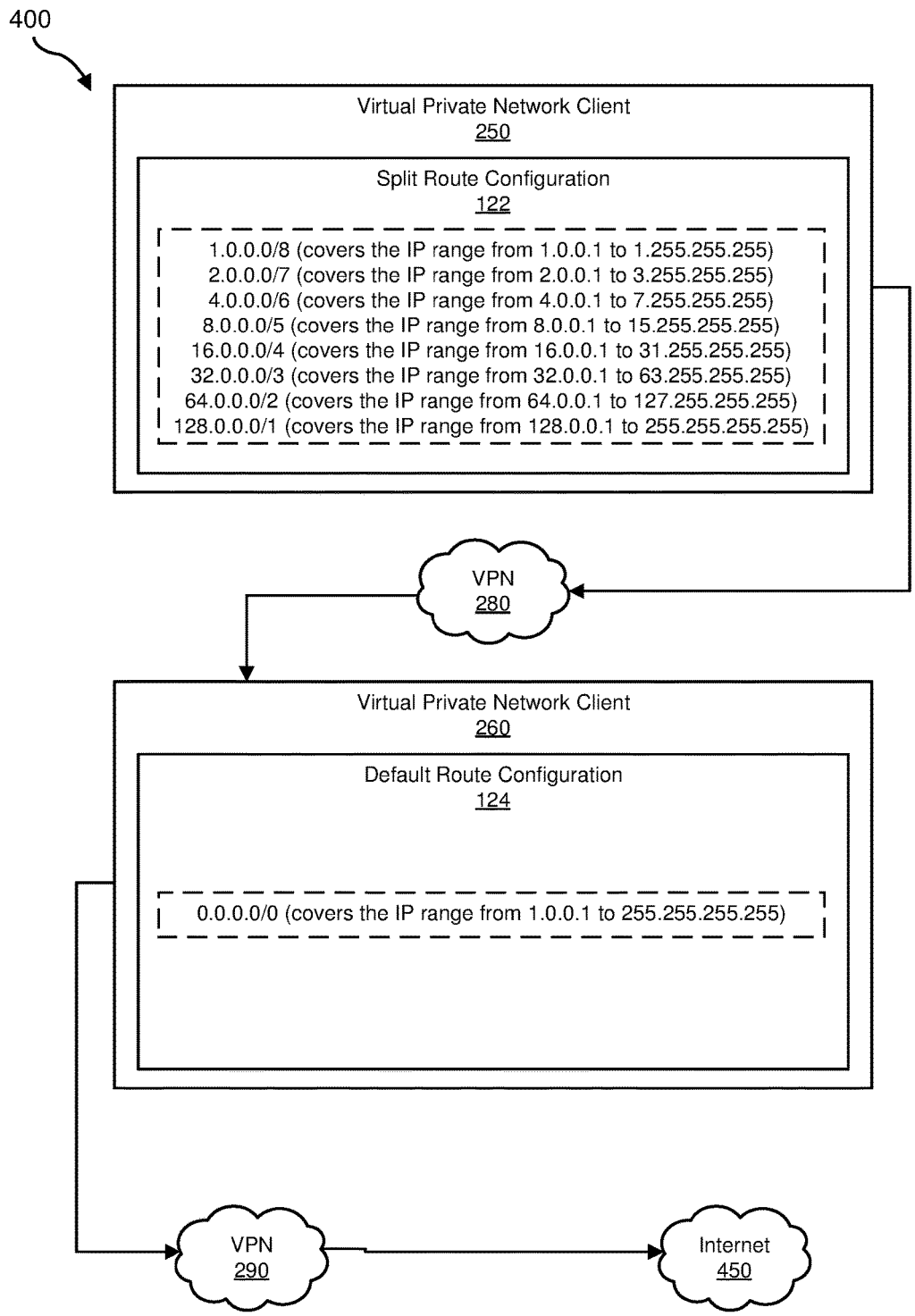
FIG. 4 is a block diagram of an example workflow corresponding to the example method for chaining virtual private network.

FIG. 4 shows one illustrative example 400 of split route configuration 122. As further shown in this figure, configuration module 106 may establish split route configuration 122 for virtual private network client 250 by specifying target network addresses that cover corresponding ranges of network addresses. For example, this figure further illustrates how the INTERNET PROTOCOL address "1.0.0.0/8" is mapped to the INTERNET PROTOCOL address range from 1.0.0.1 to 1.255.255.255. Similarly, this figure further illustrates how the INTERNET PROTOCOL address 4.0.0.0/6 is mapped to the INTERNET PROTOCOL address range from 4.0.0.1 to 7.255.255.255. In some examples, configuration module 106 may configure the virtual private network client for split routing by replacing the default route configuration for the virtual private network client with the split route configuration. For example, virtual private network client 250 may originally be configured according to default route configuration 124. Nevertheless, configuration module 106 may subsequently replace default route configuration 124 with split route configuration 122, as further shown in FIG. 4. Moreover, in these and other examples the default route configuration may be the default, predefined, and/or factory specified route configuration for the virtual private network client upon installation and prior to any further optional reconfiguration.

At step 308, one or more of the systems described herein may configure the additional virtual private network client to route all incoming network traffic according to a default route. For example, configuration module 106 may, as part of computing device 202 in FIG. 2, configure additional virtual private network client 260 to route all incoming network traffic according to a default route, as indicated by default route configuration 124. As used herein, the term "default route" generally refers to a setting on a computer that defines the packet forwarding rule to use when no specific route can be determined for a given INTERNET PROTOCOL destination address.

Configuration module 106 may configure the additional virtual private network client to route all incoming network traffic according to the default route in a variety of ways. In general, configuration module 106 may configure the additional virtual private network client to establish a routing table in a manner that parallels how configuration module 106 performed step 306 of method 300, as further discussed above.

Returning to FIG. 4, this figure further illustrates how virtual private network client 260 may be configured by configuration module 106 to route incoming network traffic according to the default route, as indicated by default route configuration 124. In contrast to the routing table shown in this figure that corresponds to split route configuration 122, the routing table for default route configuration 124 may map the default route, which corresponds to "0.0.0.0/0" in INTERNET PROTOCOL version 4 and "::/0" in INTERNET PROTOCOL version 6, to the entire range of INTERNET PROTOCOL addresses, which range from 1.0.0.1 to 255.255.255.255, as further shown in FIG. 4. Accordingly, the additional virtual private network client may optionally reroute all incoming network traffic, regardless of the INTERNET PROTOCOL address that the network traffic originally targets, according to the default route.

At step 310, one or more of the systems described herein may chain the virtual private network client and the additional virtual private network client such that they process incoming network traffic in series. For example, chaining module 108 may, as part of computing device 202 in FIG. 2, chain virtual private network client 250 and additional virtual private network client 260 such that they process incoming network traffic in series.

Chaining module 108 may chain the virtual private network client and the additional virtual private network client in a variety of ways. As used herein, the phrase "chain" generally refers to configuring the virtual private network client and the additional virtual private network client such that they process network traffic in series. Returning to FIG. 4, this figure further illustrates how chaining module 108 may chain the virtual private network client and the additional virtual private network client to process corresponding network traffic in series. As further shown in this figure, virtual private network client 250 first processes incoming network traffic. For example, virtual private network client 250 may apply split route configuration 122, and the corresponding routing table, to determine how to reroute the network traffic. In this manner, virtual private network client 250 may reroute network traffic to a location corresponding to virtual private network 280.

Subsequently, the network traffic that was previously processed by virtual private network client 250 may be further processed by virtual private network client 260. Virtual private network client 260 may process the network traffic by applying default route configuration 124 and the corresponding routing table. Accordingly, virtual private network client 260 may reroute network traffic to a location corresponding to virtual private network 290. Furthermore, FIG. 4 further illustrates how the network traffic may subsequently proceed from the location corresponding to virtual private network 290 to the external Internet, as indicated by Internet 450 shown in FIG. 4, or another wide area network, which may correspond to network 204 shown in FIG. 2.

By chaining virtual private network client 250 and virtual private network client 260, chaining module 108 may enable an end user to benefit from both the traffic inspection performed by the custom virtual private network client, which may correspond to virtual private network client 250, and the traffic encryption performed by the native virtual private network client, which may correspond to virtual private network client 260. Moreover, chaining module 108 may thereby overcome or avoid a problem that would otherwise arise within a computing environment, which may correspond to system 100 or system 200, in a case that both the virtual private network client and the additional virtual private network client are configured to process incoming network traffic according to the default route. In other words, the virtual private network client and the additional virtual private network client may optionally the established within a computing environment that is configured to create a conflict upon detecting that both the virtual private network client and the additional virtual private network client route all incoming network traffic to the default route. In these examples, configuration module 106 configuring the virtual private network client for split routing prevents a scenario where both the virtual private network client and the additional virtual private network client are configured to process network traffic according to the default route, thereby preventing, avoiding, or eliminating the conflict.

In more specific embodiments, the computing environment includes an iOS operating system environment and the computing environment is configured to disable the additional virtual private network client upon detecting that both the virtual private network client and the additional virtual private network client route all incoming network traffic to the default route. In another example, the computing environment includes a WINDOWS operating system environment and the computing environment is configured to remove a default route configuration for the additional virtual private network client in response to detecting that both the virtual private network client and the additional virtual private network client route all incoming network traffic to the default route. In either or both of these operating system environments, the operating system environment would prevent the end user from enjoying the benefits of chaining the virtual private network client and the additional virtual private network client, because both of these virtual private network clients would traditionally be configured to process network traffic according to the default route, but this creates a conflict within these operating system environments. Accordingly, dropping the default route from one of the virtual private network clients, and substituting the default route with a split route configuration, may eliminate this conflict, as further outlined above. More specifically, in these examples the split route configuration may be configured to cover the entire range of INTERNET PROTOCOL addresses and thereby simulate the default route configuration without exactly repeating the default route configuration.

In one embodiment, the different ranges of incoming network traffic sum together to effectively form the default route. For example, the different ranges of incoming network traffic may sum together to effectively cover the entire range of INTERNET PROTOCOL version 4 addresses. For example, the following ranges of INTERNET PROTOCOL addresses, as shown in split route configuration 122, sum together to form the entire range of INTERNET PROTOCOL addresses: 1.0.0.1 to 1.255.255.255, 2.0.0.1 to 3.255.255.255, 4.0.0.1 to 7.255.255.255, 8.0.0.1 to 15.255.255.255, 16.0.0.1 to 31.255.255.255, 32.0.0.1 to 63.255.255.255, 64.0.0.1 to 127.255.255.255, and 128.0.0.1 to 255.255.255.255. Moreover, because the split route configuration is more specific (e.g., more specific according to the longest prefix match method of the INTERNET PROTOCOL) than the default route, the split route configuration has a higher level of priority within the computing environment when routing network traffic. Accordingly, the network traffic will be rerouted first according to the split route configuration, as applied by the first virtual private network client, and only then subsequently rerouted according to the default route configuration, as applied by the second virtual private network client.

The split route configuration shown in FIG. 4 is merely illustrative. In another example, instead of using 1.0.0.0/8 to cover network traffic from 1.0.0.1 to 1.255.255.255, configuration module 106 can further split this range of network addresses to 1.0.0.0/9 (which covers everything from 1.0.0.1 to 1.127.255.255) and 1.128.0.0/9 (which covers everything from 1.128.0.1 to 1.255.255.255). Additionally, the disclosed subject matter may also operate according to split route configurations in which the different ranges of network addresses overlap at least partially. For example, even though configuration module 106 may specify that 128.0.0.0/1 covers network traffic from 128.0.0.1 to 255.255.255.255, configuration module 106 can still declare another split route such as 192.168.1.0/24 (192.168.1.1 to 192.168.1.255) on the same virtual private network. Both segments cover the INTERNET PROTOCOL address 192.168.1.100, for example, but the corresponding network traffic will be routed to the latter because of the longest prefix matching formula, as further discussed above. Additionally, in this scenario these two different routes will not conflict because they essentially constitute two different routes. So while setting up the split route configuration there is no single fixed solution, instead the only condition specified is that the different split routes effectively add up to the default route that covers the entire range of network addresses.

The demonstrated split route configuration shown in FIG. 4, however, is the solution with the fewest segments to cover the same range of a default route. Technically there is an easier option, which is that 0.0.0.0/1 covers network traffic from 1.0.0.1 to 127.255.255.255 and 128.0.0.0/1 covers network traffic from 128.0.0.1 to 255.255.255.255. However, in some embodiments it has been discovered that one or more operating system environments do not accept this split route configuration. For example, the iOS and/or WINDOWS operating system environments may regard 0.0.0.0/1 as an invalid route in practice, which makes the split route configuration shown in FIG. 4 to be arguably the easiest and/or most effective option.

In further embodiments, the computing environment may be configured such that the second virtual private network client is selectively applied by chaining module 108. In other words, in some embodiments a decision may be made by chaining module 108 of whether to further process network traffic, which has already been processed according to the first virtual private network client, according to the second virtual private network client. Within the iOS operating system environment, the network traffic can be forwarded to be processed by the second virtual private network client by calling the "setsockopt( )" function using the argument "IP_BOUND_IF". Within the WINDOWS operating system environment, the network traffic can be forwarded to be processed by the second virtual private network client by calling the function "bind( )" with the second virtual private network client INTERNET PROTOCOL address as an argument. Chaining module 108 may decide whether to further apply the second virtual private network client based on any one or more of a variety of different factors, which may indicate whether the network traffic should be encrypted, for example. In the case that chaining module 108 selectively omits the application of the second virtual private network client, then the network traffic may proceed directly to an original, physical, or default network adapter of computing device 202 for transmission to an outside wide area network, such as the Internet.

As further discussed above, the disclosed subject matter may improve upon related systems by combining the traffic inspection features of one virtual private network with the traffic encryption features of another virtual private network. Moreover, the disclosed subject matter may provide both of these virtual private networks, and their corresponding benefits to end users, by overcoming a conflict that otherwise exists when both virtual private networks are configured to use the same default route. More specifically, the disclosed subject matter may overcome this conflict by replacing a default route configuration for one of the virtual private networks with a split route configuration. In this case, the split route configuration may effectively simulate the default route.

Figure 5:
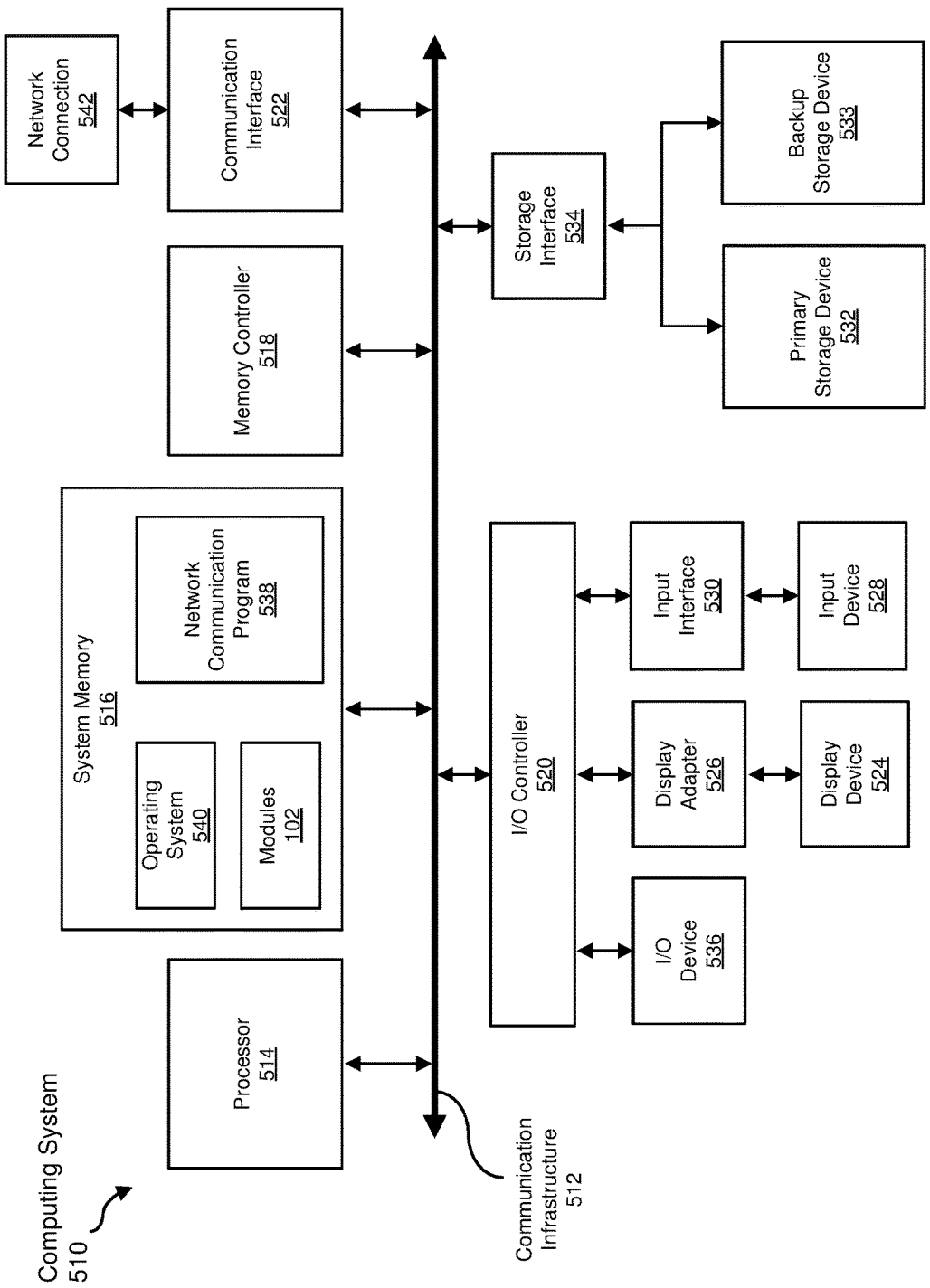
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S iOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
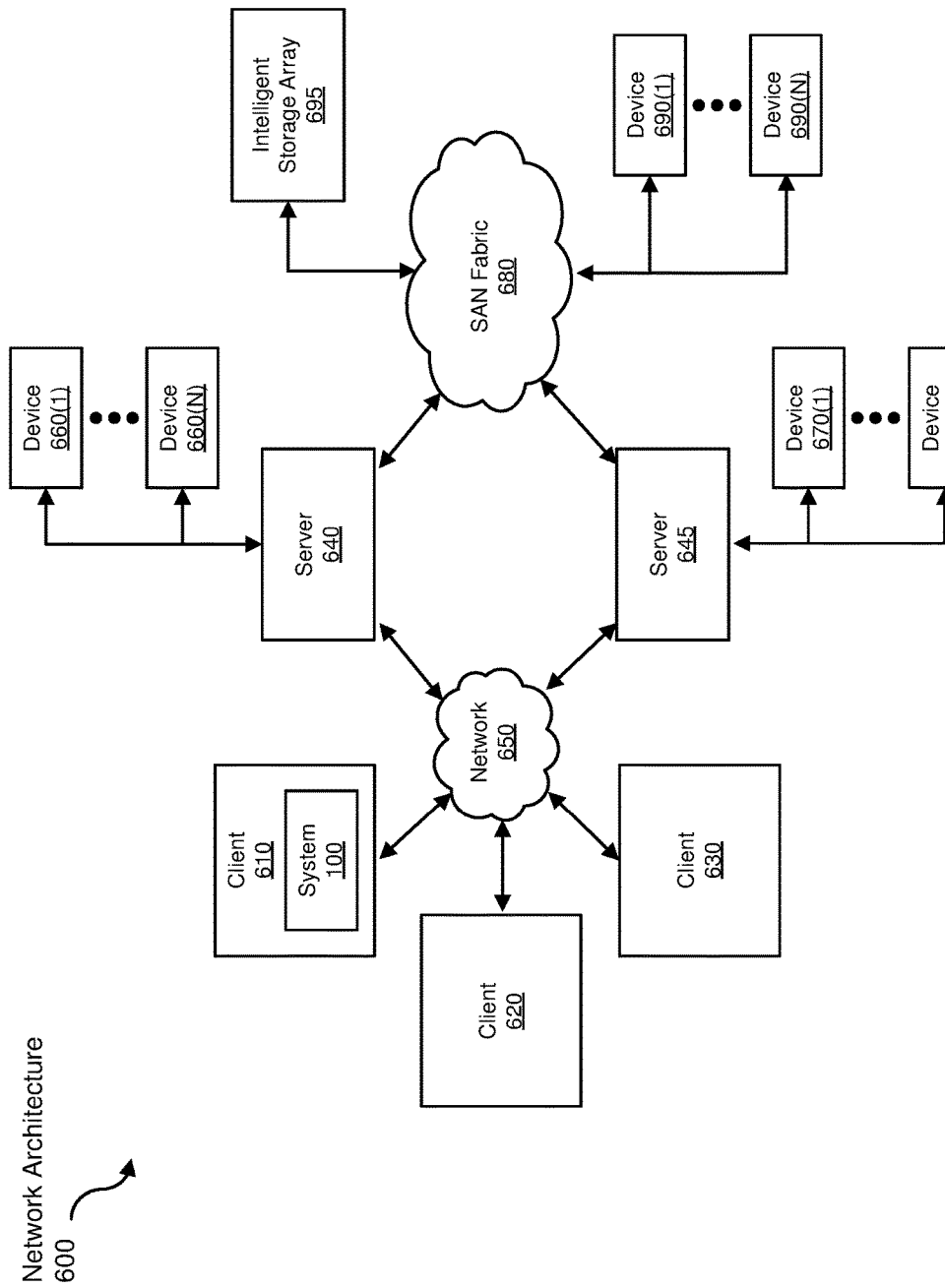
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for chaining virtual private networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for chaining virtual private networks, at least a portion of the method being performed by a computing device comprising at least one processor, the method comprising:
    establishing a virtual private network client that routes network traffic to a virtual private network;
    establishing an additional virtual private network client that routes the network traffic to an additional virtual private network;
    configuring the virtual private network client for split routing such that the virtual private network client routes different ranges of incoming network traffic to respective different network addresses;
    configuring the additional virtual private network client to route all incoming network traffic according to a default route; and
    chaining the virtual private network client and the additional virtual private network client such that they process incoming network traffic in series.

2. The computer-implemented method of claim 1, wherein the virtual private network client comprises a custom virtual private network client that performs traffic inspection.

3. The computer-implemented method of claim 2, wherein the additional virtual private network client comprises a native virtual private network client that an operating system provides to perform traffic encryption.

4. The computer-implemented method of claim 3, wherein chaining the virtual private network client and the additional virtual private network client enables an end user to benefit from both the traffic inspection performed by the custom virtual private network client and the traffic encryption performed by the native virtual private network client.

5. The computer-implemented method of claim 1, wherein configuring the virtual private network client for split routing comprises replacing a default route configuration with a split route configuration.

6. The computer-implemented method of claim 1, wherein:
    the virtual private network client and the additional virtual private network client are established within a computing environment that is configured to create a conflict upon detecting that both the virtual private network client and the additional virtual private network client route all incoming network traffic to the default route; and
    configuring the virtual private network client for split routing prevents the conflict such that chaining the virtual private network client and the additional virtual private network client is enabled.

7. The computer-implemented method of claim 6, wherein:
    the computing environment comprises an iOS operating system environment; and
    the computing environment is configured to disable the additional virtual private network client upon detecting that both the virtual private network client and the additional virtual private network client route all incoming network traffic to the default route.

8. The computer-implemented method of claim 6, wherein:
    the computing environment comprises a WINDOWS operating system environment; and
    the computing environment is configured to remove a default route configuration for the additional virtual private network client in response to detecting that both the virtual private network client and the additional virtual private network client route all incoming network traffic to the default route.

9. The computer-implemented method of claim 1, wherein the different ranges of incoming network traffic sum together to effectively form the default route.

10. The computer-implemented method of claim 9, wherein the different ranges of incoming network traffic sum together to effectively cover the entire range of INTERNET PROTOCOL version 4 addresses.

11. A system for chaining virtual private networks, the system comprising:
- an establishment module, stored in memory, that:
  - establishes a virtual private network client that routes network traffic to a virtual private network; and
  - establishes an additional virtual private network client that routes the network traffic to an additional virtual private network;
- a configuration module, stored in memory, that:
  - configures the virtual private network client for split routing such that the virtual private network client routes different ranges of incoming network traffic to respective different network addresses; and
  - configures the additional virtual private network client to route all incoming network traffic according to a default route;
- a chaining module, stored in memory, that chains the virtual private network client and the additional virtual private network client such that they process incoming network traffic in series; and
- at least one physical processor configured to execute the establishment module, the configuration module, and the chaining module.

12. The system of claim 11, wherein the virtual private network client comprises a custom virtual private network client that performs traffic inspection.

13. The system of claim 12, wherein the additional virtual private network client comprises a native virtual private network client that an operating system provides to perform traffic encryption.

14. The system of claim 13, wherein the chaining module chains the virtual private network client and the additional virtual private network client such that an end user is enabled to benefit from both the traffic inspection performed by the custom virtual private network client and the traffic encryption performed by the native virtual private network client.

15. The system of claim 11, wherein the configuration module configures the virtual private network client for split routing by replacing a default route configuration with a split route configuration.

16. The system of claim 11, wherein:
- the virtual private network client and the additional virtual private network client are established within a computing environment that is configured to create a conflict upon detecting that both the virtual private network client and the additional virtual private network client route all incoming network traffic to the default route; and
- the configuration module configures the virtual private network client for split routing such that the conflict is prevented and such that chaining the virtual private network client and the additional virtual private network client is enabled.

17. The system of claim 16, wherein:
- the computing environment comprises an iOS operating system environment; and
- the computing environment is configured to disable the additional virtual private network client upon detecting that both the virtual private network client and the additional virtual private network client route all incoming network traffic to the default route.

18. The system of claim 16, wherein:
- the computing environment comprises a WINDOWS operating system environment; and
- the computing environment is configured to remove a default route configuration for the additional virtual private network client in response to detecting that both the virtual private network client and the additional virtual private network client route all incoming network traffic to the default route.

19. The system of claim 11, wherein the different ranges of incoming network traffic sum together to effectively form the default route.

20. A non-transitory computer-readable medium comprising one or more computer-readable instructions that, when executed by at least one processor of a computing device, cause the computing device to:
- establish a virtual private network client that routes network traffic to a virtual private network;
- establish an additional virtual private network client that routes the network traffic to an additional virtual private network;
- configure the virtual private network client for split routing such that the virtual private network client routes different ranges of incoming network traffic to respective different network addresses;
- configure the additional virtual private network client to route all incoming network traffic according to a default route; and
- chain the virtual private network client and the additional virtual private network client such that they process incoming network traffic in series.

* * * * *